United States Patent
Millar et al.

[11] Patent Number: 5,157,683
[45] Date of Patent: Oct. 20, 1992

[54] LASER SYSTEMS

[75] Inventors: Colin A. Millar, Felixstowe; Jonathan R. Armitage, Ipswich, both of England

[73] Assignee: British Telecommunications plc, London, England

[21] Appl. No.: 659,389

[22] PCT Filed: Aug. 30, 1989

[86] PCT No.: PCT/GB89/01002
§ 371 Date: Mar. 5, 1991
§ 102(e) Date: Mar. 5, 1991

[87] PCT Pub. No.: WO90/03053
PCT Pub. Date: Mar. 22, 1990

[30] Foreign Application Priority Data
Sep. 9, 1988 [GB] United Kingdom ............... 8821140

[51] Int. Cl.$^5$ ............... H01S 3/091; H01S 3/094
[52] U.S. Cl. ................... 372/71; 372/23; 372/6; 372/70; 372/75; 372/97
[58] Field of Search ........... 372/6, 68, 71, 70, 75, 372/97, 23

[56] References Cited
U.S. PATENT DOCUMENTS

| | | | |
|---|---|---|---|
| 3,582,820 | 6/1971 | Snitzer | 372/68 |
| 4,589,118 | 5/1986 | Suzuki et al. | 372/71 |
| 4,956,843 | 9/1990 | Akhavon-Leilabady et al. | 372/68 |
| 4,962,995 | 10/1990 | Andrews et al. | 372/6 |

OTHER PUBLICATIONS

Electronics Letters, vol. 23, No. 20, Sep. 24, 1987, (Stevenage, Herts., GB), L. Reekie et al: "Diode-laser-pumped operation of an $Er^{3+}$-doped single-mode fibre laser" pp. 1076-1078.

Electronics Letters, vol. 23, No. 17, Aug. 13, 1987, (London, GB), L. Reeke et al "Diode-laser-pumped $Nd^{3+}$-doped fibre laser operating at 938 nm", pp. 884-885.

Electronics Letters, vol. 23, No. 16, Jul. 30, 1987, (Stevenage, Herts., GB), M. C. Brierly et al: "Nedymium-doped fluoro-zirconate fibre laser", pp. 815-817.

ECOC 87, Technical Digest vol. III, 1987, D. N. Payne et al: "Bare-earth doped fibre lasers and amplifiers", pp. 89-94.

Primary Examiner—Georgia Y. Epps
Attorney, Agent, or Firm—Nixon & Vanderhye

[57] ABSTRACT

The invention relates to laser systems of the type comprising optical fiber amplifiers. A laser system comprises a first laser 1 and a second laser 2. The second laser 2 is pumped at a first wavelength $\lambda_1$ and caused to lase at a second wavelength $\lambda_2$. The first laser 1 has absorption bands $\lambda_1$ and $\lambda_2$. The output $\lambda_2$ of laser 2 and the remnant pump at $\lambda_1$ are coupled and both are used to pump the first laser 1, thus causing laser 1 to lase at a third wavelength $\lambda_3$.

12 Claims, 2 Drawing Sheets

LASER SYSTEMS

BACKGROUND OF THE INVENTION

This invention relates to laser systems, and particularly to laser systems comprising optical fibre amplifiers.

Single mode optical fibres doped with rare-earth ions are known to exhibit optical amplification in useful regions of the spectrum when longitudinally—pumped using light of a shorter wavelength than that at which the fibres are caused to lase. This pump wavelength corresponds to an atomic absorption of the dopant ion.

As is well known in the art, when a laser is pumped with light at the pump wavelength, the ions in the laser are excited by the pump, and the laser is caused to lase. Not all of the pump light is converted to the output light of the laser, the remainder being known as the remnant pump. The remnant pump is often unusable, and so reduces the efficiency of the system.

A silica or multi component glass fibre doped with a few hundred parts per million of erbium ions is known to show optical gain at approximately 1536 nm. Suitable absorption bands in which to pump the amplifier occur at 540 nm, 650 nm, 800 nm and 980 nm. Some of these pump bands are more efficient than others. This is due to the existance of parasitic excited state absorption (ESA) of pump photons at certain wavelengths for example, erbium in silica glass has no ESA at 650 nm and 980 nm, but has significant amounts at around 800 nm. Much more efficient performance results are achieved, therefore, using a pump wavelength of 650 nm or 980 nm, rather than a pump wavelength of 800 nm.

Unfortunately, there is a scarcity of pump lasers available which are capable of pumping in the 650 nm band. In addition, the 650 nm band is not as quantum efficient as the 980 nm, but there is also a shortage of radiation sources capable of producing an output at around 980 nm. As a result optical fibre amplifiers are generally pumped at around 800 nm by, for example, high-power GaAlAs laser diodes, even though this pump band does not give the most efficient performance results.

SUMMARY OF THE INVENTION

It is an object of the invention to provide a laser system in which a laser may be pumped at a wavelength which has substantially no ESA.

According to the present invention, there is provided, a laser system comprising;

a first laser pumpable at a first and a second wavelength;

a second laser pumpable at the first wavelength whereby it is caused to lase at the second wavelength; the output of the second laser at the second wavelength, and the remnant pump at the first wavelength both being coupled to pump the first laser.

Preferably, the first laser comprises a single mode optical fibre doped with rare earth ions, for example, a silica based optical fibre doped with erbium ions. There will therefore be no ESA at pump wavelengths of around 650 nm and 980 nm. It has a further absorption band at 800 nm.

Preferably the second laser comprises a fluorozirconate fibre doped with Erbium ions and is pumped by a GaAlAs laser. The second laser may thus be pumped at around 800 nm and caused to lase at around 980 nm.

A further advantage of the invention is that the remnant pump is arranged to combine with the output of the second laser to pump the first laser. Thus the first laser may be pumped at both around 980 nm and around 800 nm, thus increasing the efficiency of the system.

Alternatively, the second laser may be a silica based fibre doped with at least two types of rare earth ions. The ions may be neodymium and ytterbium ions, and the laser may be pumped at 800 nm. Pump photons are absorbed by the neodymium ions and these excited ions then transfer their energy to the ytterbium ions via a non radiative relaxation. This may lead to a population inversion between the two ytterbium ion levels, the system lasing at 980 nm.

BRIEF DESCRIPTION OF THE DRAWINGS

The invention will now be described by way of example only with reference to the following drawings in which.

DESCRIPTION OF THE PREFERRED EMBODIMENTS

Figure 1:
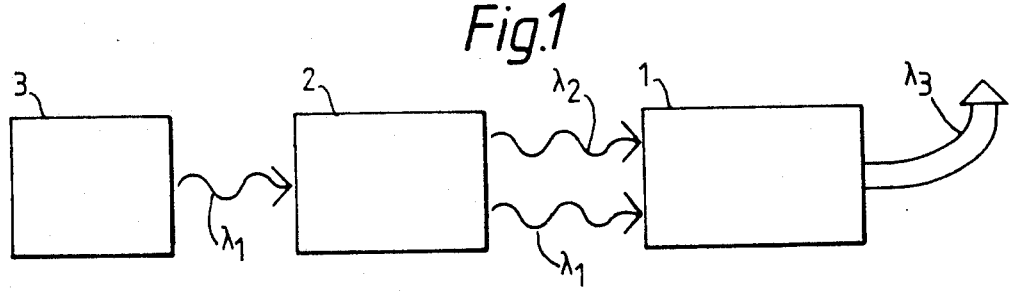
FIG. 1 is a schematic diagram of a laser system made in accordance with the invention.

Referring to FIG. 1, an embodiment of laser system according to the present invention comprises a first laser 1 which comprises a silica based optical fibre which has been doped with erbium ions, and a second laser 2 which comprises a fluorozirconate fibre which has been doped with erbium ions. A GaAlAs laser 3 is used to pump the laser 2 at a first wavelength $\lambda_1$ of 800 nm. This causes the laser 2 to lase at a second wavelength $\lambda_2$ of 980 nm. This output $\lambda_2$, together with the remnant pump $\lambda_1$ is injected into laser 1 and causes the laser 1 to lase at an output $\lambda_3$ of approximately 1540 nm.

In another example of the system of FIG. 1, laser 2 comprised an erbium doped fluoride fibre which had a 30 μm core diameter and a numerical aperture of 0.22. It was doped with 267 parts per million erbium ions, and was 35 cm long. It was a standard Fabry-Perot cavity with 95% reflectors. The pump 3 was an argon laser which pumped the laser 2 at 488 nm although pumping at 800 nm would have produced better results. The laser 2 operated at 988 nm wavelength. In this example, better results could be achieved by using a single mode fluoride fibre for laser 2.

Figure 2:
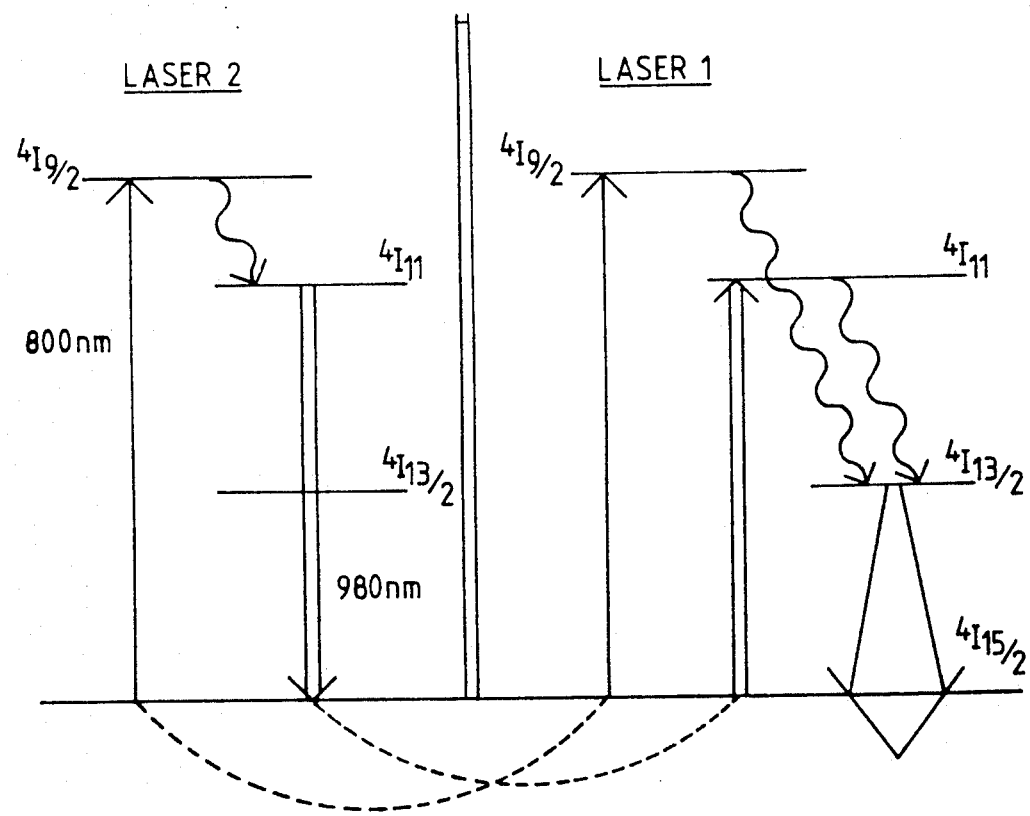
FIG. 2 shows the energy levels of an erbium doped fluorozirconate fibre laser and an erbium doped silica based fibre laser.

Referring to FIG. 2, the energy levels involved in the system of FIG. 1 are illustrated. It can be seen that laser 2 is pumped by pump 3 at 800 nm. This excites the erbium ions to the $^4I_{9/2}$ level. The ions then undergo a non-radiative decay to the $^4I_{11/2}$ level, and from there undergo a radiative transition to the $^4I_{15/2}$ level producing light at 980 nm. The output at 980 nm from this radiative decay is coupled with the pump remnant at 800 nm to pump the laser 1 at both 980 nm and 800 nm. Non radiative decay occurs from both the $^4I_{9/2}$ level and the $^4I_{11/2}$ level to the $^4I_{13/2}$ level. From there, radiative decay producing amplification of the pump input to around 1540 nm occurs to the $^4I_{15/2}$ level.

An advantage of the system is that wavelength $\lambda_2$, when efficiently converted from wavelength $\lambda_1$, may provide improved gain coefficients (in terms of dB/mW) than would have been otherwise obtained by pumping laser 1 at solely wavelength $\lambda_1$.

The radiative transition of laser 2 can be seen to be $^4I_{11/2}$–$^4I_{15/2}$. In other hosts, such as silica, this transition may not be radiative, strong phonon coupling producing fast non-radiative decays from the $^4I_{11/2}$ level to the $^4I_{13/2}$ level.

Figure 3:
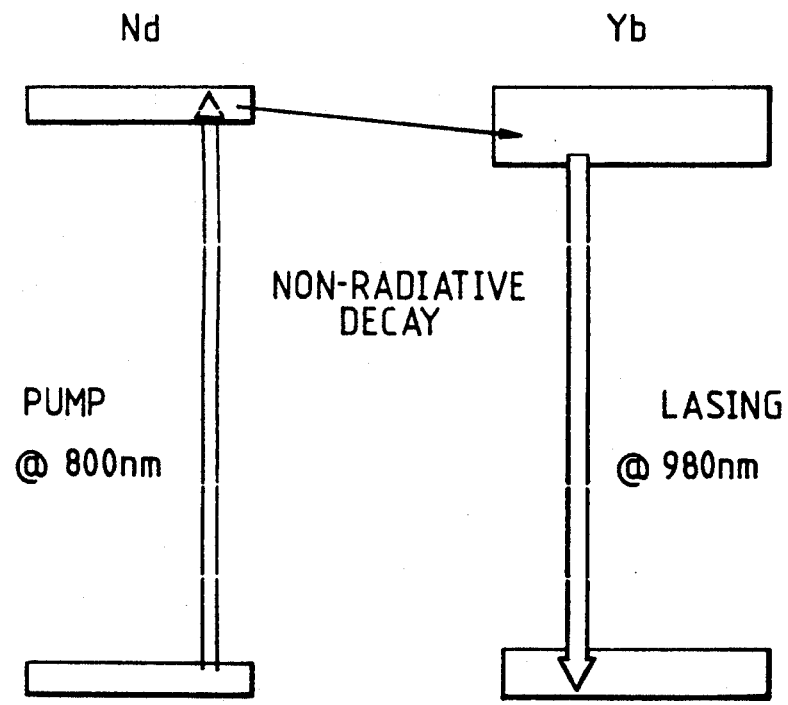
FIG. 3 is a schematic diagram of a silica based fibre laser doped with neodymium and ytterbium ions.

Referring to FIG. 3, an alternative embodiment of laser 2 is schematically illustrated. The laser 2 comprises a silica based fibre containing both neodymium ions and ytterbium ions. The laser 2 is pumped at 800 nm. Pump photons are absorbed by the neodymium ions, and these excited ions then transfer their energy to the ytterbium ions via a non radiative relaxation. A population inversion is established between the two ytterbium levels and the laser is caused to lase.

We claim:

1. A laser system comprising:
   a first laser pumpable at a first and second wavelength;
   a second laser pumpable at the first wavelength and generating a laser output at the second wavelength wherein the output of the second laser at the second wavelength and the remnant pump at the first wavelength both pump the first laser.

2. A system according to claim 1 wherein the first laser is a single mode optical fibre doped with rare-earth ions.

3. A system according to claim 2 wherein the first laser is a silica based optical fibre doped with erbium ions.

4. A system according to claim 1 wherein the second laser comprises a fluorozirconate based laser doped with erbium ions.

5. A system according to claim 4 wherein the second laser is a single mode fibre.

6. A system according to claim 1, wherein the second laser is a silica based fibre doped with both neodymium and ytterbium ions.

7. The system according to claim 1, wherein the first laser is efficiently pumped at the second wavelength to provide optical gain to an input signal.

8. The system according to claim 3 wherein the second laser is pumped at a wavelength of 800 nm and the first laser is pumped by both the second laser output and the remnant pump at wavelengths of 980 nm and 800 nm, respectively, such that the first laser lases at 1540 nm.

9. An optical fiber amplifier system comprising:
   first and second lasers connected in series wherein the first laser is pumped with the output of the second laser and the remnant pump of the second laser such that the first laser is pumped at a wavelength having substantially no excited state absorption.

10. The system according to claim 9 wherein the first laser efficiently amplifies an optical input signal.

11. The system according to claim 9 wherein said first and second lasers are longitudinally pumped.

12. The system according to claim 9 wherein the second laser is pumped at a first wavelength and the first laser is pumped at the first wavelength and a second wavelength.

* * * * *